Oct. 25, 1966 R. J. MOONEY ETAL 3,280,653
MULTIPLE UNIT FLYWHEEL WITH ENGINE CONDITION CONTROL
Filed July 7, 1964

INVENTORS
Raymond J. Mooney
Fay A. Roepcke
By Orin R. Severn
THEIR ATTORNEY

United States Patent Office 3,280,653
Patented Oct. 25, 1966

3,280,653
MULTIPLE UNIT FLYWHEEL WITH ENGINE CONDITION CONTROL
Raymond J. Mooney, Pompton Lakes, and Fay A. Roepcke, Wyckoff, N.J., assignors to Curtiss-Wright Corporation, a corporation of Delaware
Filed July 7, 1964, Ser. No. 380,893
4 Claims. (Cl. 74—572)

This invention relates to engine flywheels of the multiple-unit type wherein at least one "free" unit and an engine-attached unit are connected and disconnected for varying the effective flywheel mass at the engine drive shaft in response to predetermined change in an engine condition, incident to the start-idle and normal running operations respectively, of the engine.

Multiple-unit or variable-mass flywheels of various types have been proposed for overcoming certain problems inherent in starting engines under load pick-up conditions, etc. In a known form, a main flywheel is fixed on an engine stub drive shaft, and a second flywheel is fixed on an aligned stub-load shaft, the two flywheels being engaged by a centrifugally operated friction clutch or the like, when the drive shaft comes up to proper speed. Thus, the load shaft and its separate flywheel are gradually picked up through this clutch until the complete shaft-flywheel assembly is rotating as a unit with maximum flywheel effect. The apparent purpose here is to provide minimum flywheel effect during engine start and "pick-up," and maximum stabilizing effect during the normal running operation.

A variable-mass flywheel as described above however, has little or no utility for engines commonly used in motor vehicles, such as internal combustion engines that generate pulsing power. Here, it is important that engine operation in the starting and idling speed range where "stalling" is most frequent, be made uniformly continuous and smooth, by comparatively high flywheel inertia and that the flywheel stabilizing effect in the normal running and high-speed range be minimized by reducing the flywheel inertia so as not materially to affect desired acceleration and deceleration characteristics of the engine.

A principal object therefore of this invention is to provide an improved variable inertia flywheel assembly for the drive shaft of internal combustion engines of the pulsing power type, that is controlled automatically in response to change in an engine condition for stabilizing the engine in the starting and idling periods, and for materially reducing the flywheel stabilizing effect and improving engine response in the normal speed or running range.

In accordance with this invention, the full effective moment of inertia of the total flywheel mass is applied to the drive shaft when the engine is in static condition and throughout the starting period by uniting the complete flywheel assembly so as to rotate as a unit with the engine shaft, a materially reduced flywheel moment of inertia is applied for desired engine speed response during the normal running operation by declutching a "free" flywheel unit or units so that the engine-attached flywheel only, then functions as the flywheel.

The invention will be more fully set forth in the following description referring to the accompanying drawing and the features of novelty will be pointed out with particularity in the claims annexed to and forming a part of this specification.

Referring to the drawing.

Figure 1:
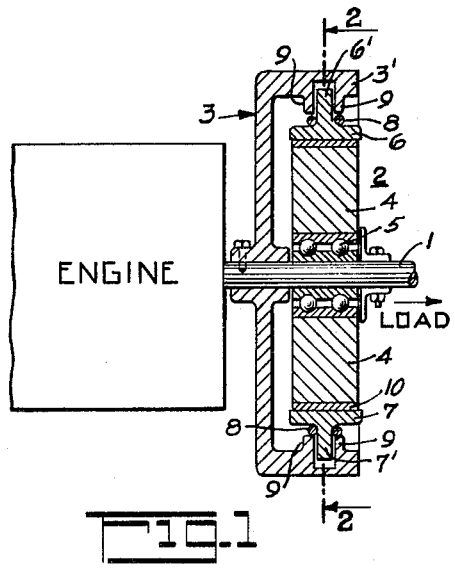
FIG. 1 is a side view, partly in section of an engine-flywheel assembly embodying the multiple-unit flywheel of the present invention.
Figure 2:
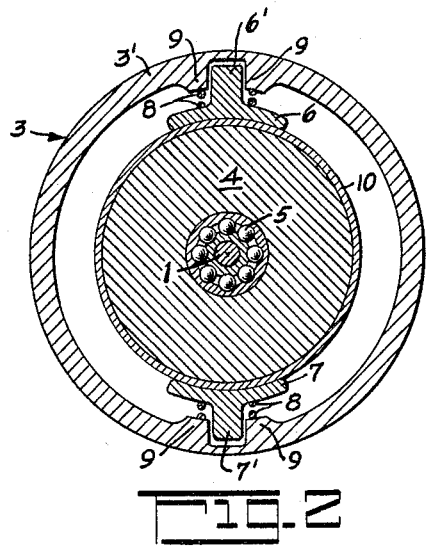
FIG. 2 is a view taken along the section of 2—2 of FIG. 1.

An engine with a multi-unit flywheel embodying this invention is shown by FIGS. 1 and 2 wherein the controlling condition for clutching and declutching the flywheel masses is the engine r.p.m. This form of the invention is applicable generally to internal combustion engines where stabilization is desired during the starting operation and also where desired in subsequent idling operations of the engine, and fast response is desired in the normal running operation.

The engine indicated may be of the conventional internal combustion reciprocating piston type or of the rotating piston type, the engine power in both cases being applied in consecutive pulses to the engine output or drive shaft 1.

The shaft 1 has mounted thereon a flywheel assembly 2 comprising in the assembly shown, a first flywheel unit 3 fixed to the shaft 1, and a second "free" disk-like flywheel unit 4 that is mounted on a suitable shaft bearing 5 for floating or free rotation relative to the shaft. For compact design a flywheel-clutch arrangement is shown wherein the flywheel unit 3 may have a peripheral flange 3' that overhangs the concentrically positioned free unit 4 so as to form an annular space within which are disposed means for clutching and declutching the floating flywheel unit 4 with respect to the fixed flywheel 3 and engine shaft 1.

The mass and configuration of the first unit 3 are selected so that the moment of inertia of that unit is optimum for the required speed response of the given engine in the normal running speed range, which includes high-speed operation. The moment of inertia and configuration of the second unit 4 are selected so that when the two flywheels are both rotating in fixed relation to the drive shaft, the moment of inertia of the flywheel assembly is optimum for stabilized operation in the start-idling range.

Figure 3:
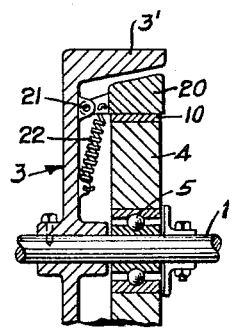
FIG. 3 is a partial side view showing a modified form of the multiple-unit flywheel of FIGS. 1 and 2.

In FIGS. 1, 2 and 3, operation of the means for clutching and declutching is responsive to shaft rotation rate, i.e. engine r.p.m. in the starting and idling, and the normal running ranges respectively. Conveniently, the clutch means can be centrifugally operated for declutching, and spring biased for clutching. Where suitable, other known speed responsive means may be used in practicing the invention.

Referring to FIGS. 1 and 2, a pair of clutch members 6 and 7 are diametrically positioned at and carried on the inner side of the flange 3' of the first unit 3. Biasing springs 8 between the members and their respective retaining guides 9 on the flange 3' permits frictional clutching engagement with a circular clutch band 10 secured to the peripheral surface of the second unit 4. Each clutch member is guided as by a rod extension 6' in a radial direction for engagement with and disengagement from the clutch band.

The mass of each clutch member is selected with reference to its associated spring characteristic so that at a given speed, centrifugal force acting radially on the member causes the spring to yield, thereby releasing the member and declutching the units 3 and 4. Such release can take place when the engine r.p.m. increases beyond idling range.

The clutch member guiding and biasing means are shown for simplicity in elementary form; in practice, the retainer 9 may include suitable anti-friction means for precluding any binding of the guide rod 6' and the spring biasing means may be of known snap-over type for quick clutch release, if such is preferred.

Summarizing briefly, the multiple-unit flywheel assembly is united as a single unit to the engine shaft by the spring biased clutch in the start-idle period for maximum stabilization, thus tending to eliminate roughness and stalling. When the engine r.p.m. has increased to the normal running range, the clutch is released by centrifugal force and the free unit 4 is declutched from the shaft. The first unit 3 now on the shaft has sufficiently low moment of inertia to allow the desired engine response for acceleration and deceleration. When the engine r.p.m. subsequently drops to the idling range, the spring bias overcomes centrifugal force and the flywheel units 3 and 4 are again clutched to provide the desired stabilization in this range. Thus, the essential feature of the present invention is that the flywheel inertia acting on the engine drive shaft is varied as described above for improving the starting and running characteristics of a pulsing power-type engine.

In a modified form shown by FIG. 3, a clutch member 20 is mounted pivotally at 21 on the inner side of the first unit 3, and is spring biased at 22 in lever manner into engagement with the clutch band 10 of the unit 4 during start-idle. As in FIG. 1, centrifugal force tends to release the clutch, i.e. urge the member 20 counter-clockwise as shown, and declutch the unit 4 at a selected running r.p.m.

Where the characteristics of the internal combustion engine require stabilization against roughness and stalling during the initial or cold-engine start and idle, and such stabilization is not essential during idling after the engine is "warmed-up," the clutching and declutching operations may be responsive to change in an engine condition that is incident to the start and running periods, such as engine temperature. As engine temperature rather than r.p.m., is now the engine condition control factor, the clutch member can as preferred, be mounted either on the first unit 3, or on the free unit 4 thereby to decrease the effective mass of the first unit 3.

Figure 4:
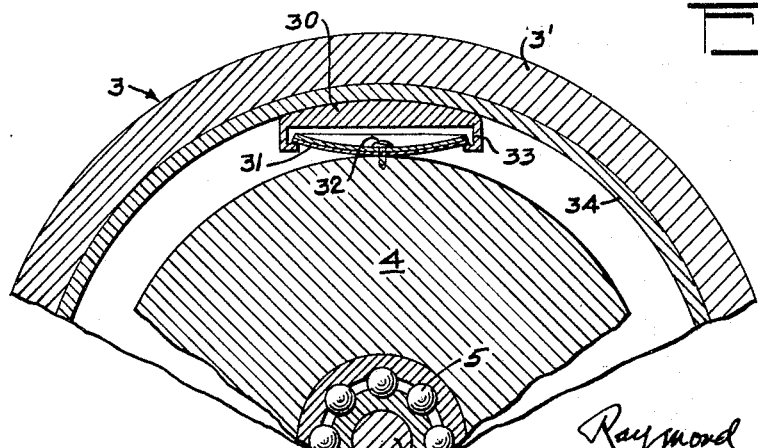
FIG. 4 is another form of the invention for special application to certain types of internal combustion engines.

Such an arrangement is shown by FIG. 4 wherein a simple, inexpensive and low-mass temperature responsive device is used for actuating a clutch member 30. The thermo-responsive device may be a rugged concavo-convex bi-metal disk 31 (of the type used in thermostats), suitably secured at its center 32 to the periphery of the free unit 4. The disk at its periphery is fitted in a circular retaining notch or groove 33 in the adjoining face of the member 30.

The bi-metal disk 31 is constructed in known manner so that in its "cold" position, it is contracted into the curvature shown in FIG. 4. In this position it sets the member 30 against the clutch band 34, which in turn is secured to the inner side of the flange 3' of unit 3. The units 3 and 4 are thereby clutched during the cold-start operation.

Assume now, starting of the engine and subsequent heating of the engine block which in practice is closely adjacent to the flywheel. The consequent heating and expansion of the high coefficient element of the bi-metal then causes the disk to flatten somewhat, thereby withdrawing the clutch member from the band 34 and declutching the units 3 and 4 at a preselected temperature attained by the disk 31, say in the range 100°–125° F., where stalling is no longer a problem. The engine now is capable of improved response for acceleration and deceleration as previously described.

Where quick release of the clutch is desired, the disk may have reduced curvature and designed to "snap-over" at the preselected temperature. After stopping of the engine, the block cools to its "cold-start" condition, at which time the disk 31 sets the clutch for the next cold-start operation.

Where the clutch member is carried by the first unit 3, the disk will be reversed and connected in the manner above indicated between the flange 3' and the member for withdrawing it from the clutch band on the free unit 4 in accordance with the temperature selected for a "warmed-up" engine.

The characteristics of certain engines make it desirable to maintain high flywheel mass, both during the complete engine "warm-up" period and also during subsequent idling of the warmed-up engine. The most common problem here is where engine r.p.m. drops into the idling range at traffic stops and roughness and possibly stalling occur.

Figure 5:
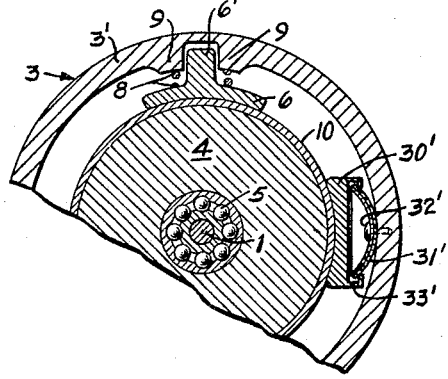
FIG. 5 is a partial side view of the flywheel assembly showing application of the invention for complete overall control throughout both cold-start and warm engine operation.

For improving over-all operation, referring to FIG. 5, an r.p.m. response control may be used in the same flywheel combination for conjoint operation with a temperature response control, each in the manner previously described for integrated control of the flywheels 3 and 4 during the principal conditions of engine operation.

As will now be apparent, the flywheels are engaged (clutched) by the temperature responsive element 31' and related clutch member 30' throughout the cold-start period, irrespective of the operation of the r.p.m. responsive means 6 and 8. A balanced arrangement is indicated by FIG. 5 wherein for simplicity, but one of each pair of diametrically positioned friction clutch devices is shown, the respective pairs of devices subject to the different controls being angularly spaced by 90° with respect to the engine shaft and flywheel assembly. It will be understood of course that the invention comprises the use of multiple pairs of friction clutch devices as required by practical considerations.

When the engine is sufficiently warmed-up and assuming now normal engine r.p.m., the flywheels are fully de-clutched at 6 and 30 for desired engine response. The temperature responsive control of course remains inactive, i.e. de-clutched, during all operation of the warmed-up engine; however, the r.p.m. responsive control is fully operative throughout the speed range of the engine and takes over full control, as in FIGS. 1–3. Thus, in accordance with this invention, the advantages of both engine r.p.m. and temperature control can be realized in a single flywheel assembly for improving over-all operation.

It should be understood that this invention is not limited to specific details of construction and arrangement thereof herein illustrated, and that changes and modifications in the specific clutch construction, for example, may occur to one skilled in the art without departing from the spirit of the invention.

We claim:

1. In an engine generating pulsing power, an output drive shaft, a variable mass flywheel comprising a first flywheel unit fixed to said shaft and having a moment of inertia selected for fast engine speed response during normal operation, a second flywheel unit freely rotatable with respect to said shaft and having a moment of inertia selected with reference to that of the first flywheel unit so that the resultant moment of inertia of the combined units is suitable for stabilizing engine operation at initial and low speed incidental to the starting, idle and warm-up conditions, and means mounted in the flywheel for varying the effective mass thereof comprising a first clutch means independently responsive to engine r.p.m. for clutching the flywheel units at low and idling speeds and for declutching them at normal running speeds, and a second clutch means independently responsive to engine temperature for clutching during cold-start and initial engine warm-up and for declutching at normal running temperature, said first and second clutch means thereby conjointly varying flywheel mass according to characteristic engine conditions in the over-all operation thereof.

2. Apparatus as specified in claim 1 wherein the second clutch means includes a friction clutch member carried by one of the flywheel units for engaging the other unit, and a thermo-responsive device interconnects said clutch member and its supporting unit for clutching and declutching said units in accordance with a cold-start temperature of the engine and a normal running temperature, respectively.

3. Apparatus as specified in claim 1 wherein the first clutch means includes a pair of friction clutch members disposed respectively at diametrically opposite positions with respect to the flywheel units and the second clutch means includes another pair of friction clutch members having respective thermo-responsive actuating devices, the members of said second pair being likewise disposed respectively at diametrically opposed positions on the flywheel and individually displaced 90° with respect to the members of the first clutch means.

4. Apparatus as specified in claim 2 wherein the thermo-responsive device is a bi-metal, concavo-convex disk mounted between the clutch member and its supporting flywheel unit.

References Cited by the Examiner

UNITED STATES PATENTS

| | | |
|---|---|---|
| 2,630,893 | 3/1953 | Misch et al. |
| 2,652,816 | 9/1953 | Dodge. |
| 2,657,852 | 11/1953 | Spase. |
| 2,758,689 | 8/1956 | Spase _____ 192—104 |

FOREIGN PATENTS

| | | |
|---|---|---|
| 575,339 | 4/1924 | France. |
| 775,092 | 10/1934 | France. |

FRED C. MATTERN, Jr., *Primary Examiner.*

BROUGHTON G. DURHAM, *Examiner.*

W. S. RATLIFF, *Assistant Examiner.*